(12) United States Patent
Martin et al.

(10) Patent No.: US 12,468,726 B2
(45) Date of Patent: Nov. 11, 2025

(54) DYNAMIC COMPRESSION FOR DATA REPLICATION

(71) Applicant: Dell Products L.P., Hopkinton, MA (US)

(72) Inventors: Owen Martin, Hopedale, MA (US); Ramesh Doddaiah, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/535,168

(22) Filed: Dec. 11, 2023

(65) Prior Publication Data

US 2025/0190446 A1 Jun. 12, 2025

(51) Int. Cl.
*G06F 16/27* (2019.01)
*H04L 47/38* (2022.01)

(52) U.S. Cl.
CPC .............. *G06F 16/27* (2019.01); *H04L 47/38* (2013.01)

(58) Field of Classification Search
CPC ................................ G06F 16/27; H04L 47/38
See application file for complete search history.

(56) References Cited

U.S. PATENT DOCUMENTS

2016/0344844 A1* 11/2016 Lin .................. H04L 67/34
2020/0241805 A1* 7/2020 Armangau ............ G06F 3/0659

* cited by examiner

*Primary Examiner* — Aleksandr Kerzhner
*Assistant Examiner* — Aryan D Toughiry
(74) *Attorney, Agent, or Firm* — Anderson Gorecki LLP

(57) ABSTRACT

Storage arrays include inline compression hardware that can simultaneously implement multiple compression levels at line rate. For each compression level, compression efficiency is inversely related to processing efficiency. A compression level is dynamically selected for segments of replication data based on one or more of compression hardware utilization, network utilization, network latency, data compressibility, and IO size. The compression hardware utilization may be maintained at or near full utilization. Extents of data of a replica are analyzed based on compressibility. Replication data that resides in an extent of relatively incompressible data, or that is associated with a relatively small IO, may be compressed using a compression level characterized by greater processing efficiency.

20 Claims, 12 Drawing Sheets

| Compressed IO Sizes | Level 9 FAST algorithm | Level 1 Efficient algorithm |
|---|---|---|
| 2K | | |
| 4K | | |
| 8K | +1 | +4 |
| 16K | | |
| 24K | | |
| 32K | | |

Figure 11

DYNAMIC COMPRESSION FOR DATA REPLICATION

TECHNICAL FIELD

The subject matter of this disclosure is generally related to electronic data storage.

BACKGROUND

Electronic data storage is a critical infrastructure for software-based organizational processes. A typical datacenter includes clusters of server computers and data storage nodes. The servers run instances of host applications that support organizational processes such as email, accounting, inventory control, e-business, and engineering. Host application data is maintained by the storage nodes. A host application image is a collection of logical disk drives, known as storage objects, devices, or volumes, on which all the data for a single host application is maintained. The host application image may be replicated by storage nodes located at different data centers to enable remote failover with less significant interruption of the host applications than restoring from backup. In general, replication is either synchronous or asynchronous, depending on IO latency tolerance. It is known to compress the replication data that is sent between datacenters in order to utilize available network bandwidth more efficiently. Typically, a single, fast compression algorithm is used to perform compression at line-speed such that compression does not contribute to latency.

SUMMARY

An apparatus in accordance with some implementations comprises a compute node that manages access to a plurality of non-volatile drives on which a primary array replica storage object is maintained, including responding to commands from host servers to update segments of data on the primary array replica storage object, the compute node comprising a microprocessor, volatile memory, and compression hardware configured to compress the segments into replication data for transmission to a target storage system via a network to update a secondary array replica of the storage object, the compression hardware being configurable to selectively implement one of a plurality of compression levels for each segment of the replication data, the compression levels including a first compression level that exhibits greater compression efficiency than other compression levels and a second compression level that exhibits greater processing efficiency than other compression levels, the compute node configured to dynamically select and implement ones of the compression levels to compress ones of the segments of replication data based on forecast utilization of the compression hardware.

A method in accordance with some implementations comprises: maintaining a primary array replica storage object, including responding to commands from host servers to update segments of data on the primary array replica storage object; maintaining a secondary array replica storage object, including compressing the segments into replication data for transmission to a target storage system via a network to update the secondary array replica of the storage object; and selectively implementing one of a plurality of compression levels for each segment of the replication data, the compression levels including a first compression level that exhibits greater compression efficiency than other compression levels and a second compression level that exhibits greater processing efficiency than other compression levels, and including selecting ones of the compression levels to compress ones of the segments of replication data based on forecast utilization of the compression hardware.

In accordance with some implementations, a non-transitory computer-readable storage medium stores instructions that are executed by a computer to perform a method comprising: maintaining a primary array replica storage object, including responding to commands from host servers to update segments of data on the primary array replica storage object; maintaining a secondary array replica storage object, including compressing the segments into replication data for transmission to a target storage system via a network to update the secondary array replica of the storage object; and selectively implementing one of a plurality of compression levels for each segment of the replication data, the compression levels including a first compression level that exhibits greater compression efficiency than other compression levels and a second compression level that exhibits greater processing efficiency than other compression levels, and including selecting ones of the compression levels to compress ones of the segments of replication data based on forecast utilization of the compression hardware.

The summary does not limit the scope of the claims or the disclosure. All examples, embodiments, aspects, implementations, and features can be combined in any technically possible way and the method and process steps may be performed in any order.

BRIEF DESCRIPTION OF THE FIGURES

FIG. 11 illustrates extent-level compression forecasting.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array as the storage node. Such implementations are not limiting. For example, a wide variety of storage nodes might be implemented with the inventive concepts. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
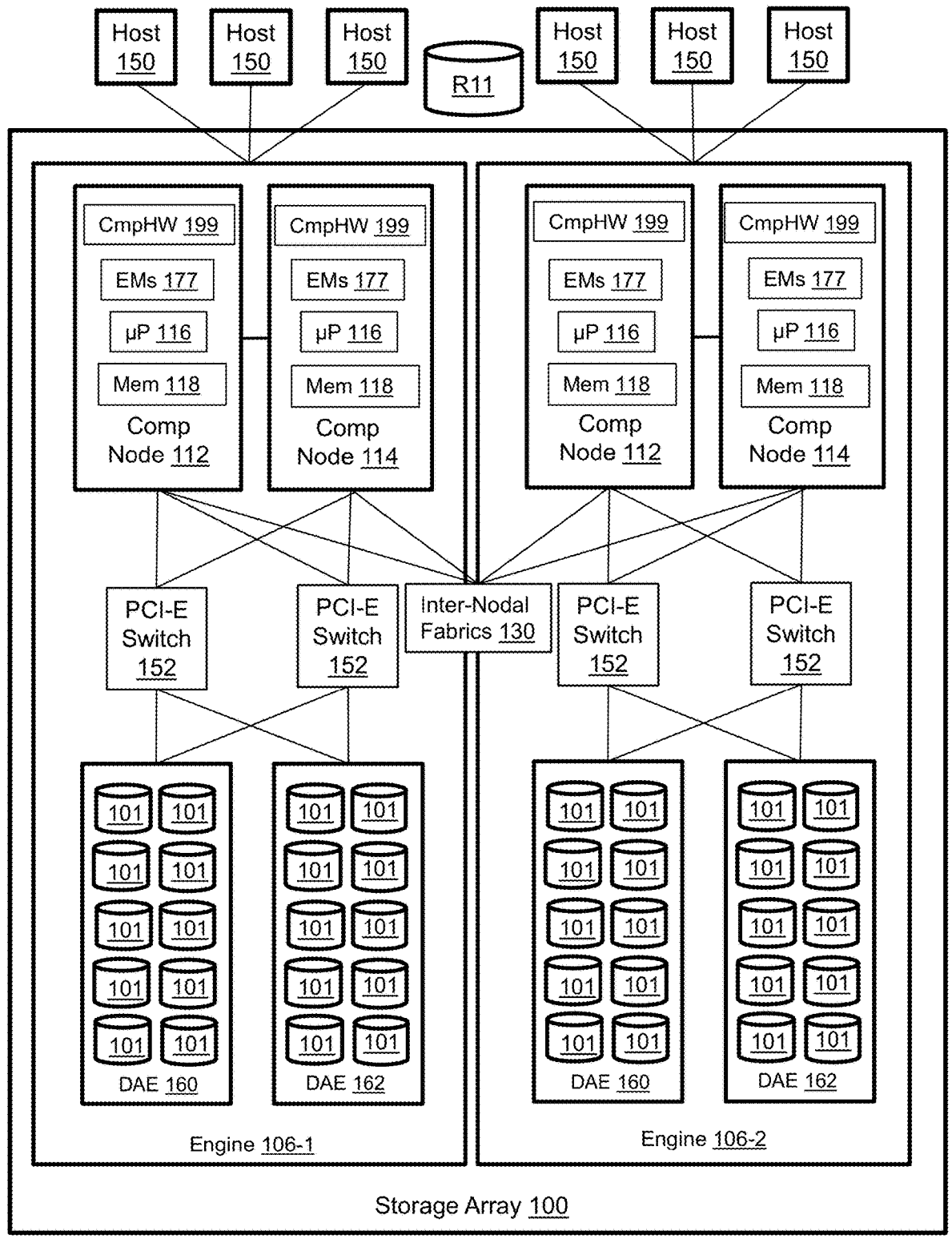
FIG. 1 illustrates a storage array.

FIG. 1 illustrates a storage array 100. The storage array is just one example of a storage node with which the inventive features may be implemented. The storage array includes two engines 106-1, 106-2. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130. Each compute node 112, 114 runs emulations (EMs 177) for performing different storage-related tasks and functions. Front-end emulations handle communications with the host servers 150. For example, front-end emulations receive IO commands from instances of host applications running on the host servers and return data and write acknowledgements to the host servers. Back-end emulations handle communications with managed drives 101 in the DAEs 160, 162 to read and write data. Data services emulations process IOs, including creating and updating metadata. Remote data services emulations handle communications with other storage systems, e.g., other storage arrays for remote replication and remote snapshot creation. Inline compression hardware 199 is configured to perform line-rate compression and decompression of replication data sent between storage arrays to maintain a remote replica. As will be explained below, compression hardware 199 is configured to dynamically select and implement ones of a plurality of compression levels that differ in terms of compression efficiency and processing efficiency.

Figure 2:
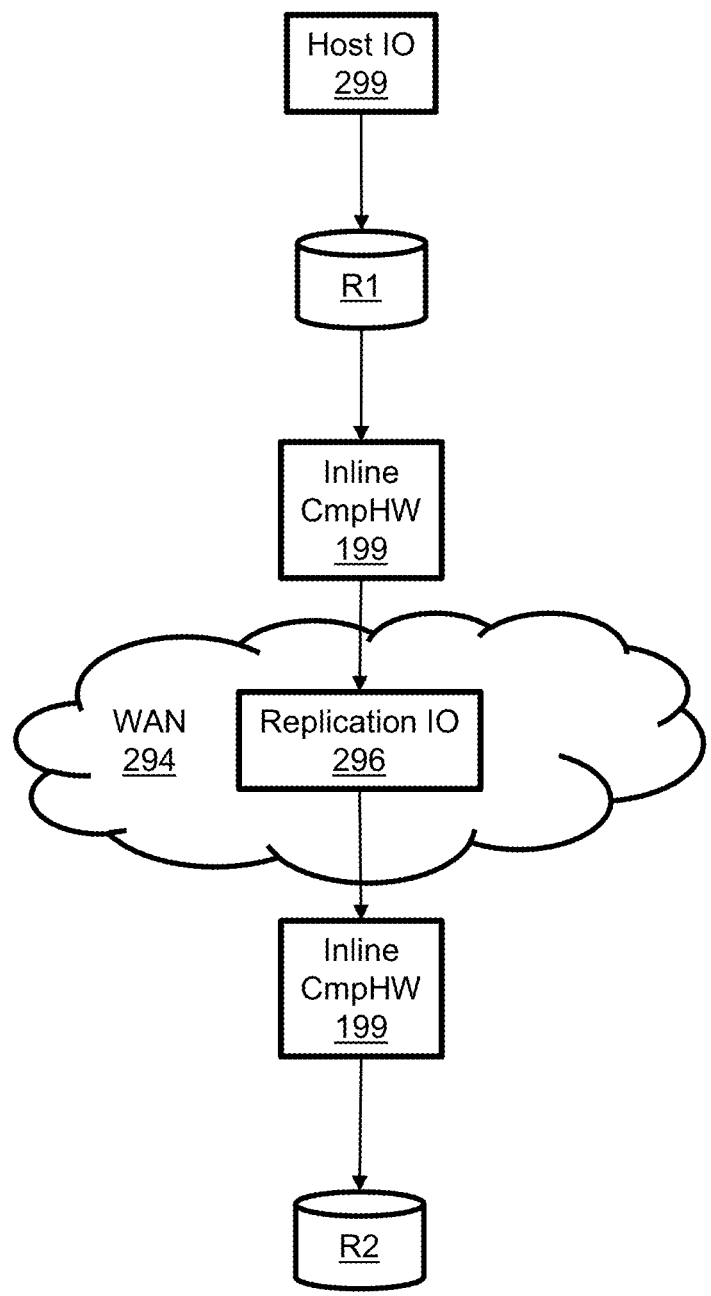
FIG. 2 illustrates a data replication pipeline.

FIG. 2 illustrates a data replication pipeline. A primary array R1 device is a member of a replication pair that includes a corresponding secondary array R2 device. R1 is located at the source (production) site. R2 is located at the target (remote) site. R1 devices are generally Read/Write accessible to the host application using host IOs 299. Host IOs that write to the R1 device result in updates that are mirrored over Replication Data Facility (RDF) links to the R2 device by compressing the updated data with the inline compression hardware 199, sending the compressed data in a replication IO 296 over a Wide Area Network (WAN) 294 to the target site, and decompressing the data using remote inline compression hardware 199 so that it can be written to R2. In general, data on R2 devices is not available to the host application while the RDF relationship is active. In RDF synchronous mode, however, an R2 device can be in a Read-Only mode that allows a host to read from the R2.

Figure 3:
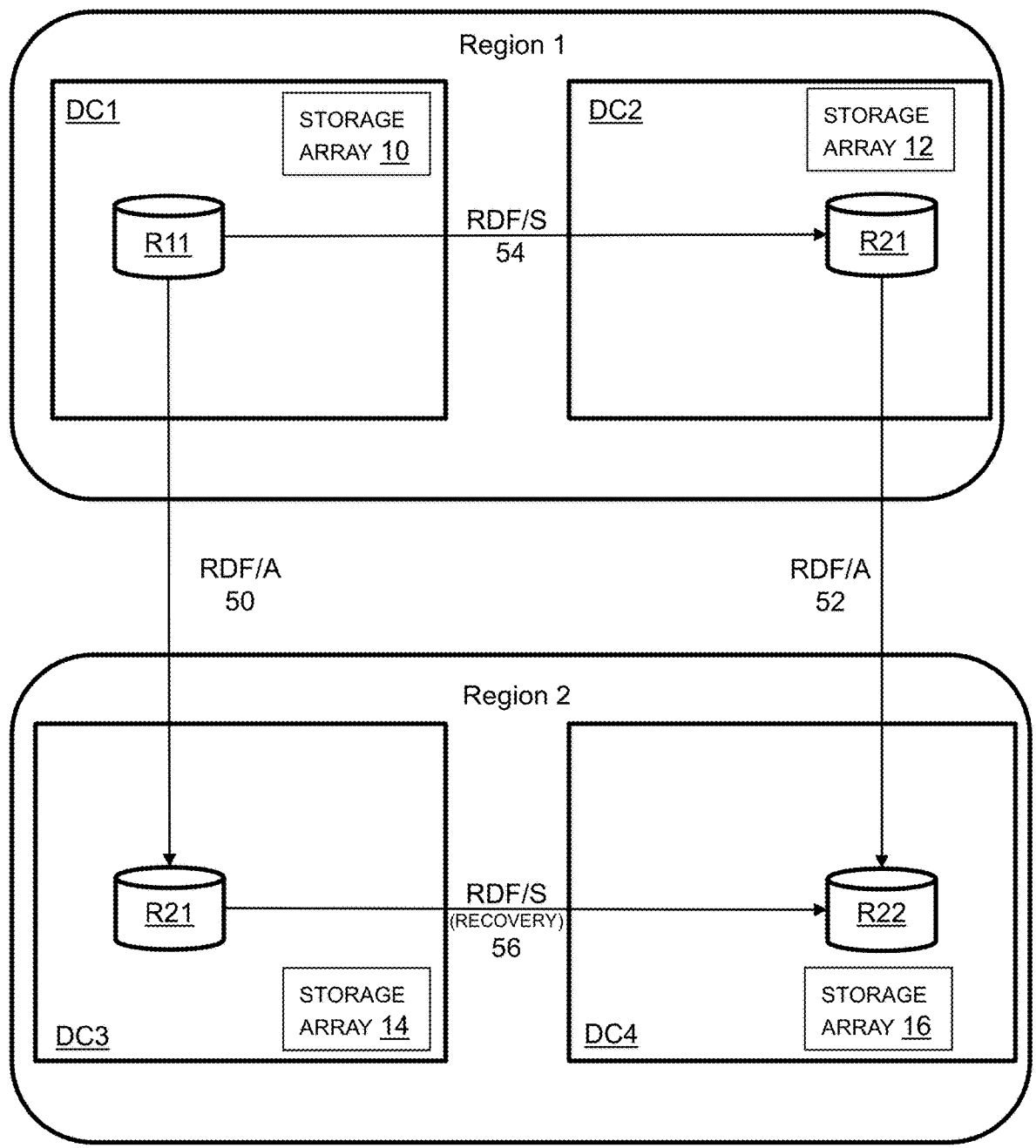
FIG. 3 illustrates a Geographically Dispersed Disaster Restart (GDDR) Remote Data Facility with Quadrilateral Asynchronous Replication (RDF/QAR).

FIG. 3 illustrates a Geographically Dispersed Disaster Restart (GDDR) Remote Data Facility with Quadrilateral Asynchronous Replication (RDF/QAR). RDF/QAR is a four-site implementation of synchronous replication (RDF/S) and asynchronous replication (RDF/A) that enables differential resynchronization between sites along the perimeter of a "square" RDF topology using redundant RDF/A connections 50, 52 for continuous Disaster Recovery (DR) protection out of region. The GDDR RDF/QAR data storage system includes four data centers DC1, DC2, DC3, DC4 that are deployed in two geographic regions labelled as region 1 and region 2. DC1 and DC2 are in region 1. DC3 and DC4 are in region 2. DC1, which is a primary site, includes a storage array 10. DC2, which is a secondary site, includes a storage array 12. DC3, which is a primary site, includes a storage array 14. DC4, which is a secondary site, includes a storage array 16. Intra-regional links such as DC1 to DC2 have a maximum allowable physical distance, e.g., 200 km. Inter-regional links do not have such a limit and are greater than the intra-regional limit in some implementations.

A dataset such as a host application image stored on storage objects of a Versioned Data Group (VDG) is maintained at DC1 by storage array 10 on replica R11. R11 devices operate as the R1 device in a configuration with two R2 devices. R21 devices have a dual role and are used in cascaded 3-site configurations. R22 devices have two R1 devices, only one of which is active at a time. R11 is synchronously replicated at DC2 on replica R21 by storage array 12 via RDF/S connection 54. R11 is synchronously replicated by marking updated tracks of R11 as invalid until the changes are written to the synchronous remote replica R21 in DC2. Synchronously replicated host writes are contemporaneously written to both storage arrays in real time before the host application IO completes. Acknowledgments are not sent to the host until the data is stored in cache on both storage arrays, so remote storage array 12 must return an acknowledgement of replication of the changes to storage array 10 before the updated tracks on R11 can be marked valid and accessed again by a host application. RDF/S maintains a real-time mirror image of data between R1 and R2 devices. R11 is asynchronously replicated at DC3 on replica R21 by storage array 14 via RDF/A connection 50. RDF/A maintains a dependent-write consistent copy between the R1 and R2 devices. All host writes are collected over a configurable time interval, e.g., from 15-60 seconds, and sent to the remote storage array as a "delta set." Unlike synchronous replication, local storage array 10 does not wait for an acknowledgement of replication of the changes by remote storage array 14 before marking the updated tracks as valid. R21 is asynchronously replicated at DC4 on replica R22 by storage array 16 via RDF/A connection 52. R11 is asynchronously replicated by writing updated tracks of R11 to the asynchronous remote replica R21. Replica R21 is synchronously replicated at DC4 on replica R22 by storage array 16 via RDF/S connection 56. Asynchronous replication may be more practical to implement than synchronous replication when acknowledgment receipt latency would be too disruptive to host application performance. Acknowledgment receipt latency is at least in part a function of physical distance so inter-region links are subject to greater latency than intra-region links. Compression levels may be dynamically selected at both the level of replicated extents of the host application image and the link level, e.g., using a different compression level for replication of the same extent data depending on whether replication is via RDF/A 50 or RDF/S 54.

Figure 4:
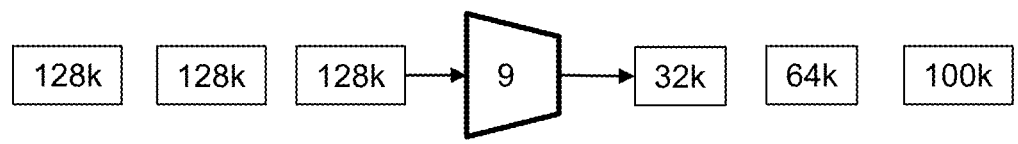
FIG. 4 illustrates characteristics of different levels of inline compression hardware.

FIG. 4 illustrates different levels of compression that can be implemented by the inline compression hardware 199. Compression level 1 is characterized by greater compression efficiency than the other levels, where compression efficiency correlates with achieved compression ratios. Compression level 9 is characterized by greater processing efficiency than the other levels, where processing efficiency correlates with the number of segments of data of a given size that can be compressed per unit of time, per unit of compression resources. The different compression levels are associated with different compression algorithms or compression algorithms with different configurations. In the illustrated example, level 1 compression is shown reducing a 128 k data segment to 16 k, which is an 8:1 compression ratio. Level 9 compression is shown reducing three 128 k data segments to 32 k, 64 k, and 100 k, respectively, which correspond to compression ratios of less than 8:1. However, the level 9 compression compresses three 128 k segments in the same unit of time and with the same resources that level 1 compression uses to compress a single 128 k segment. Compression levels between 1 and 9, of which there may be any number, are characterized by decreasing compression efficiency with increasing processing efficiency relative to level 1. The compression ratio achieved for a given segment of data is dependent on the compressibility of the data and the compression efficiency of the compression algorithm, but in general the compression algorithm associated with level 1 compression achieves greater compression ratios than level 9, whereas level 9 uses fewer compression resources per segment of a given size such that more segments can be compressed in a unit of time, albeit at lower compression ratios. The compression hardware 199 can be configured to contemporaneously implement compression at different levels, e.g., selectively compressing some data using level 1 while at the same time selectively compressing other data using level 9.

Figure 5:
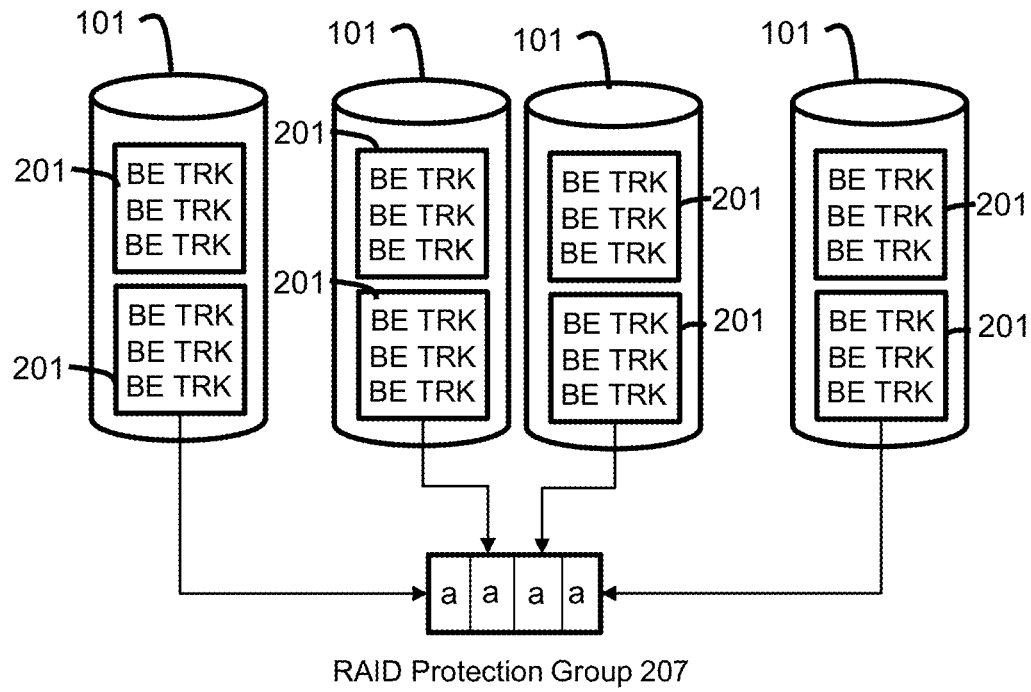
FIG. 5 illustrates the data extents that are used to select and implement the compression levels.
Figure 5:
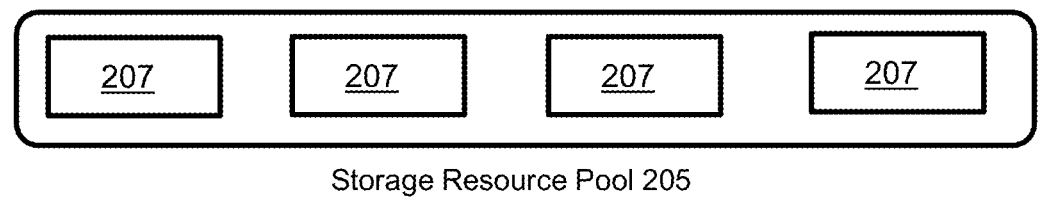
Figure 5:
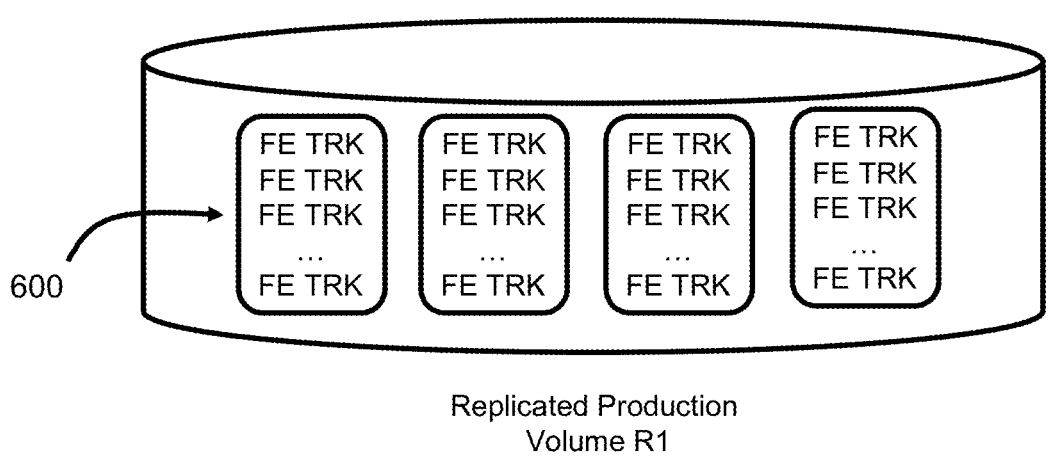

FIG. 5 illustrates the data extents 600 that are used to select and implement the compression levels. The compute nodes maintain metadata that maps between the logical block addresses (LBAs) of replicated production storage objects such as R1 and physical addresses on the managed drives 101 in order to process IOs from the host servers. The basic allocation unit of storage capacity that is used by the compute nodes to access the managed drives 101 is a back-end track (BE TRK). The managed drives are organized into same-size splits 201, each of which may contain multiple BE TRKs. A grouping of splits 201 from different managed drives 101 is used to create a RAID protection group 207 with each split containing a protection group member. A storage resource pool 205 is a type of storage object that includes a collection of protection groups of the same RAID level, e.g., RAID-5 (3+1), on thinly provisioned logical data devices (TDATs) that are used to create R1. The host application data is logically stored in front-end tracks (FE TRKs) on R1. The FE TRKs are mapped to the BE TRKs on the managed drives and vice versa by tables and pointers that are maintained in the shared memory. The FE-TRKs are organized into same-size groups known as extents 600. Each extent may have a contiguous range of LBAs with a size that is large enough to be statistically representative of compressibility of the data stored therein.

Figure 6:
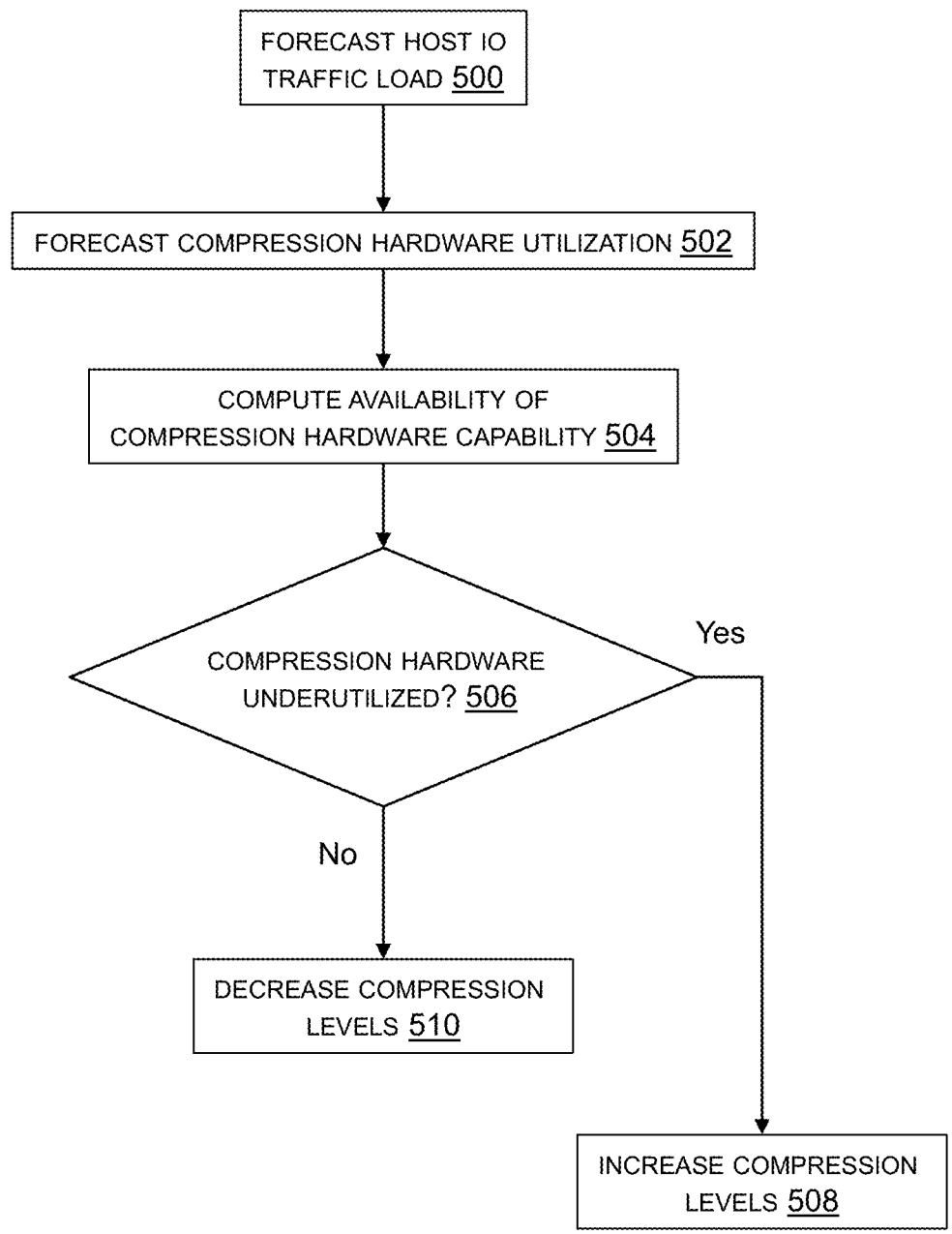
FIG. 6 illustrates dynamic adjustment of compression levels based on compression hardware utilization.

FIG. 6 illustrates dynamic adjustment of compression levels based on changing utilization of the compression hardware 199 (FIG. 1). Step 500 is forecasting host IO traffic loading on the primary site storage array. Any of a wide variety of IO forecasting techniques may be used. The forecast may include one or more of numbers of IOs expected to be received in a future interval of time, types of the IOs (e.g., ratio of reads to writes), sizes of the IOs, and devices and address ranges expected to be accessed. Step 502 is computing a forecast of utilization of the compression hardware based on the forecasted host IO traffic load. Step 504 is computing availability of compression hardware capabilities. In other words, with current compression hardware level configurations, what is the forecast utilization of the compression hardware in view of the forecast change in host IO traffic. Step 506 is forecasting whether the compression hardware will be underutilized. A threshold value that distinguishes underutilization versus full or overutilization is not necessarily 100% utilization of the compression hardware. For example, 80% or 90% utilization may be selected to allow for inaccuracies in forecasts. If the compression hardware is forecast to be underutilized, then step 508 increases one or more of the current compression levels being implemented by the compression hardware. If the compression hardware is forecast to not be underutilized, then step 510 decreases one or more of the current compression levels being implemented by the compression hardware. The process helps to maintain near full utilization of the compression hardware while quickly adapting to changes in IO traffic loading such that overutilization of the compression hardware is avoided. As will be explained below, these macro adjustments can be finetuned based on other factors.

Figure 7:
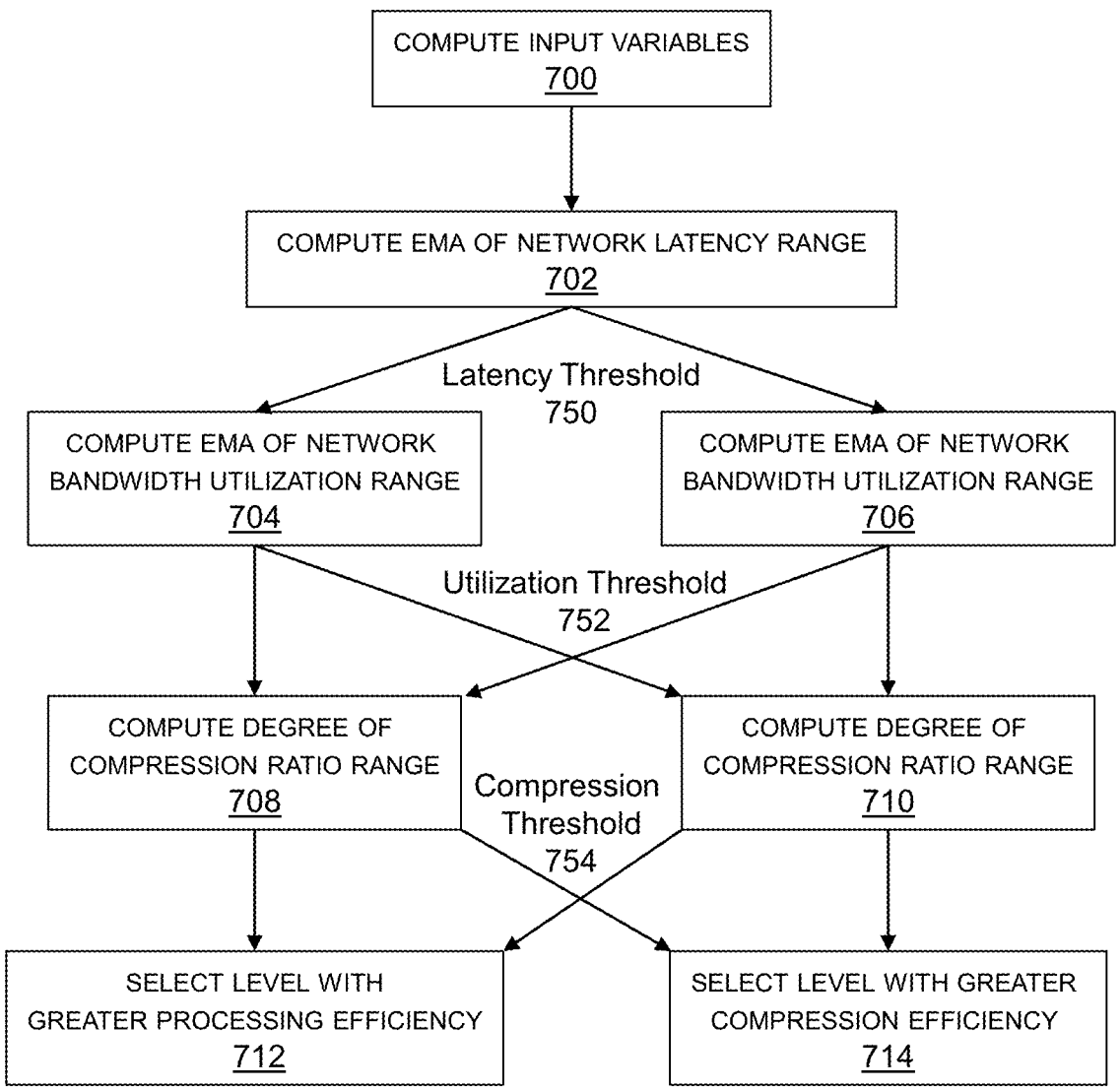
FIG. 7 illustrates per-extent dynamic compression level selection based on network latency, network bandwidth utilization, and compression thresholds.

FIG. 7 illustrates per-extent dynamic compression level selection based on network latency, network bandwidth utilization, and compression thresholds. Step 700 is computing values of input variables. The input variables include one or more of network latency between the storage arrays that maintain R1 and R2, utilization of available network bandwidth, extent-level compression ratio range, compression hardware utilization at the primary site, and forecasted IO sizes to the extent. Step 702 is computing an exponential moving average of the network latency range. Depending on how that compares with latency threshold 750, flow proceeds to either step 704 or step 706 on the level 9 branch or the level 1 branch, respectively. In steps 704 and 706 the exponential moving average of the network bandwidth utilization range is computed. Depending on how that compares with utilization threshold 752, flow processed to either step 708 or step 710 on the level 9 branch or the level 1 branch, respectively. In step 708 and 710 the degree of compression ratio range is computed. Depending on how that compares with compression threshold 754, a compression level characterized by greater processing efficiency is selected in step 712 or a compression level characterized by greater compression efficiency is selected in step 714. The thresholds may be selected such that compression efficiency is increased for relatively compressible data in response to transient network congestion evidenced by increasing network latency or network utilization. Further, some data may be less efficiently compressed in response to impending overutilization of compression hardware to the degree possible within the constraints of available network utilization.

Figure 8:
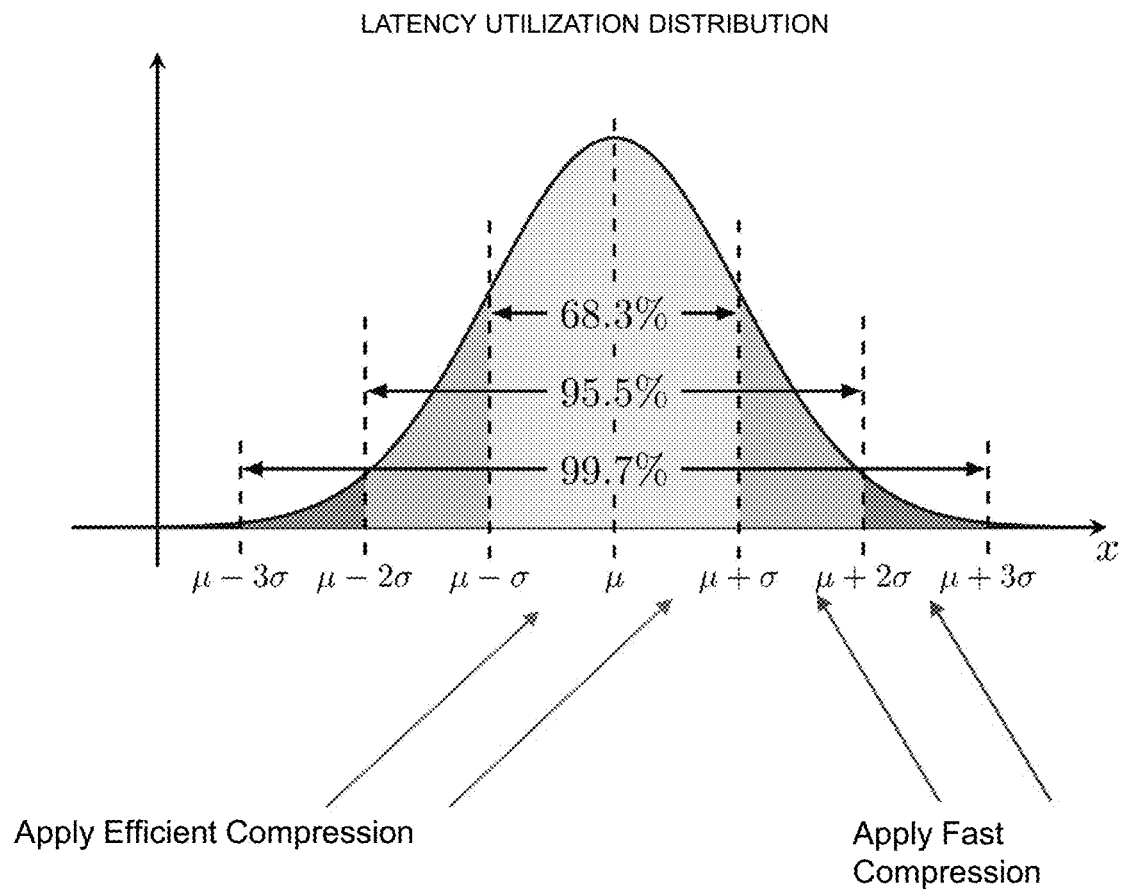
FIG. 8 illustrates the latency threshold.

FIG. 8 illustrates the latency threshold. Network latency corresponds to the elapsed time from when a replication IO is sent from a primary site storage array to when that replication IO is received by the secondary site storage array. Network latency may be a function of various factors including geographical distance traversed and buffering of network traffic. The Gaussian network latency utilization distribution at 10%, 20% . . . 90%, 100% of various network bandwidth utilization workloads is learned. The parameter $\mu$ is the mean or expectation of the distribution (and also its median and mode), while the parameter $\sigma$ is its standard deviation. In general, a compression level characterized by more efficient compression is selected when the current network latency is close to the mean value of the network latency distribution. In the illustrated example, the latency threshold is $\mu+\sigma$. However, the threshold can be dynamically adjusted.

Figure 9:
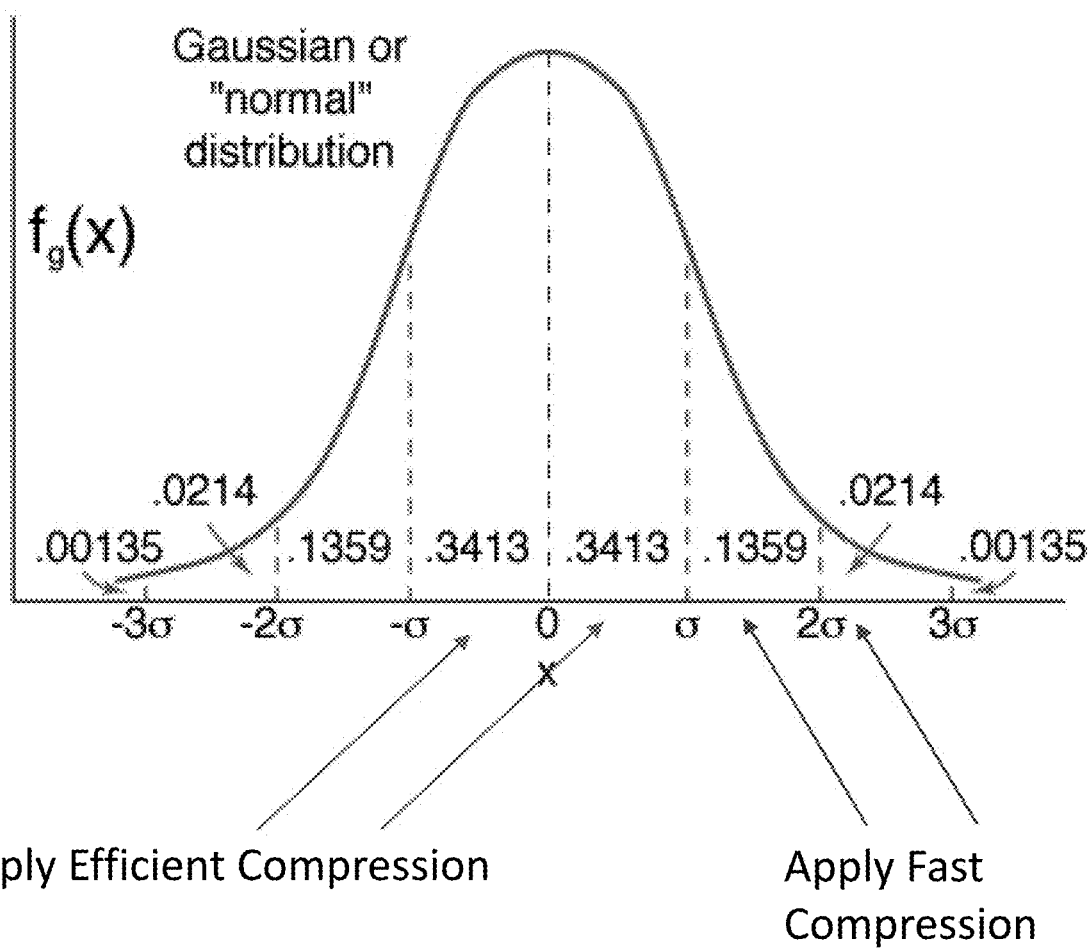
FIG. 9 illustrates the utilization threshold.

FIG. 9 illustrates the utilization threshold. Network bandwidth utilization distribution at 10%, 20% . . . 90%, 100% of various bandwidth utilization workloads is learned. Network bandwidth is the amount of data that can be transmitted via a link between the primary storage array and the secondary storage array per unit of time. Network bandwidth utilization may be represented as a percentage of the available network bandwidth that is in use for transmission of replication data. In general, a compression level characterized by more efficient compression is selected when the current network latency is close to the mean value of the network latency distribution. In the illustrated example, the utilization threshold is $\mu+\sigma$. However, the threshold can be dynamically adjusted.

Figure 10:
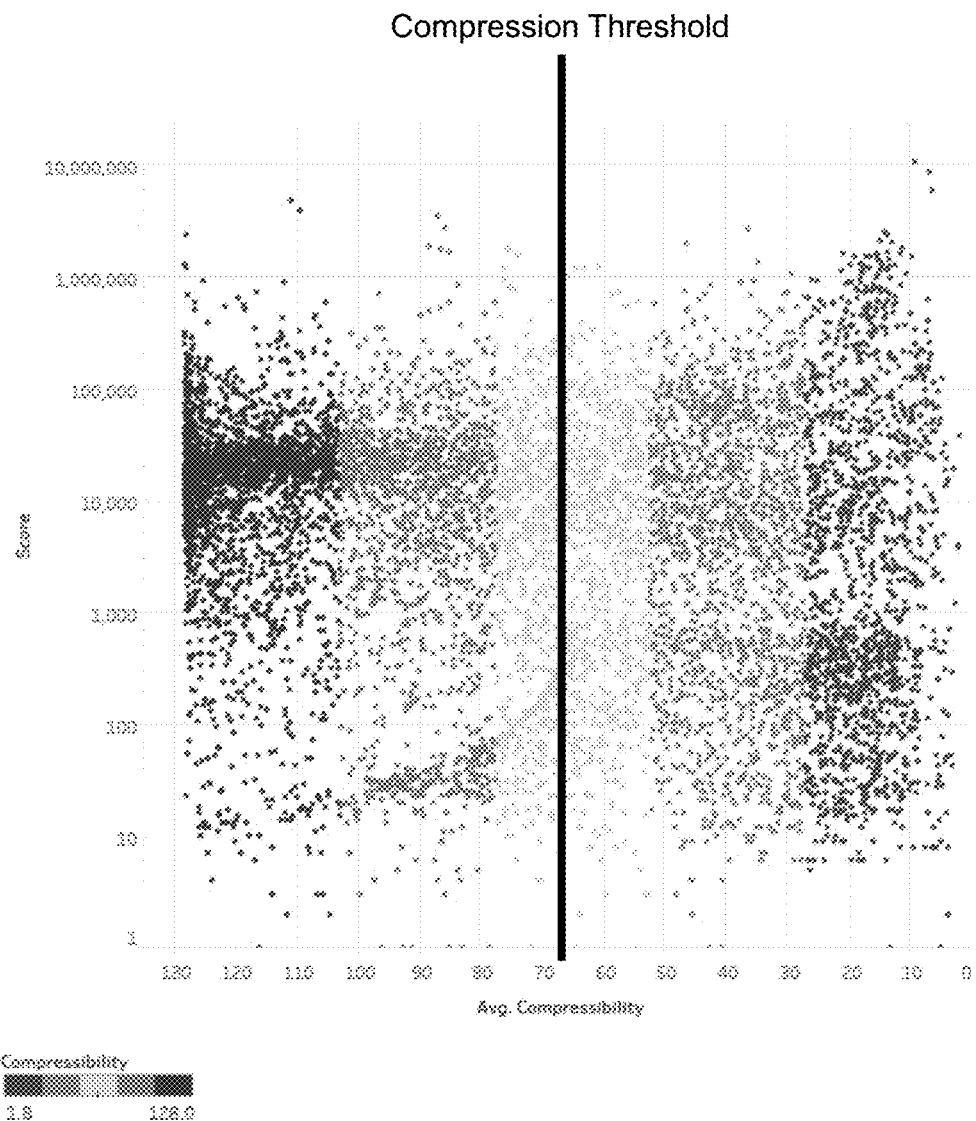
FIG. 10 illustrates the compression threshold.

FIG. 10 illustrates the compression threshold. Sampled compressed IOs in a region to the left of the threshold exhibit greater data reduction ratios (greater compressibility). Sampled compressed IOs in a region to the right of the threshold exhibit lesser data reduction ratios (greater incompressibility). Using a compression level with greater compression efficiency yields greater returns for IOs in the region to the left of the threshold due to relative compressibility of the data. Using a compression level with greater processing efficiency yields greater returns for IOs in the region to the right of the threshold due to relative incompressibility of the data. The threshold can be dynamically adjusted.

FIG. 11 illustrates extent-level compression forecasting. A forecasted metric for each extent is generated based on which compression level is utilized. In the illustrated example, compression level 9 is applied to relatively smaller, e.g., 32 k, segments and compression level 1 is applied to relatively larger, e.g., 128 k, segments. A histogram of compressed size is incremented on each compression operation for the two different compression algorithms deployed, with the bin sizes being 2 k, 4 k, 8 k, 16 k, 24 k, 32 k. For example, when compression level 9 is used, reducing the 32 k source data to 8 k prompts incrementing the 8 k bin by 1. When compression level 1 is used, reducing the 128 k source data to 32 k prompts incrementing the 8 k bin by 4. This is because compression level 1 is applied to 128 k source data and division by 4 normalizes the metric. The storage array that maintains R2 periodically exchanges these metrics with the storage array that maintains R1. The primary storage array uses the metrics to select a default compression level to apply to RDF IOs associated with the extent.

Figure 12:
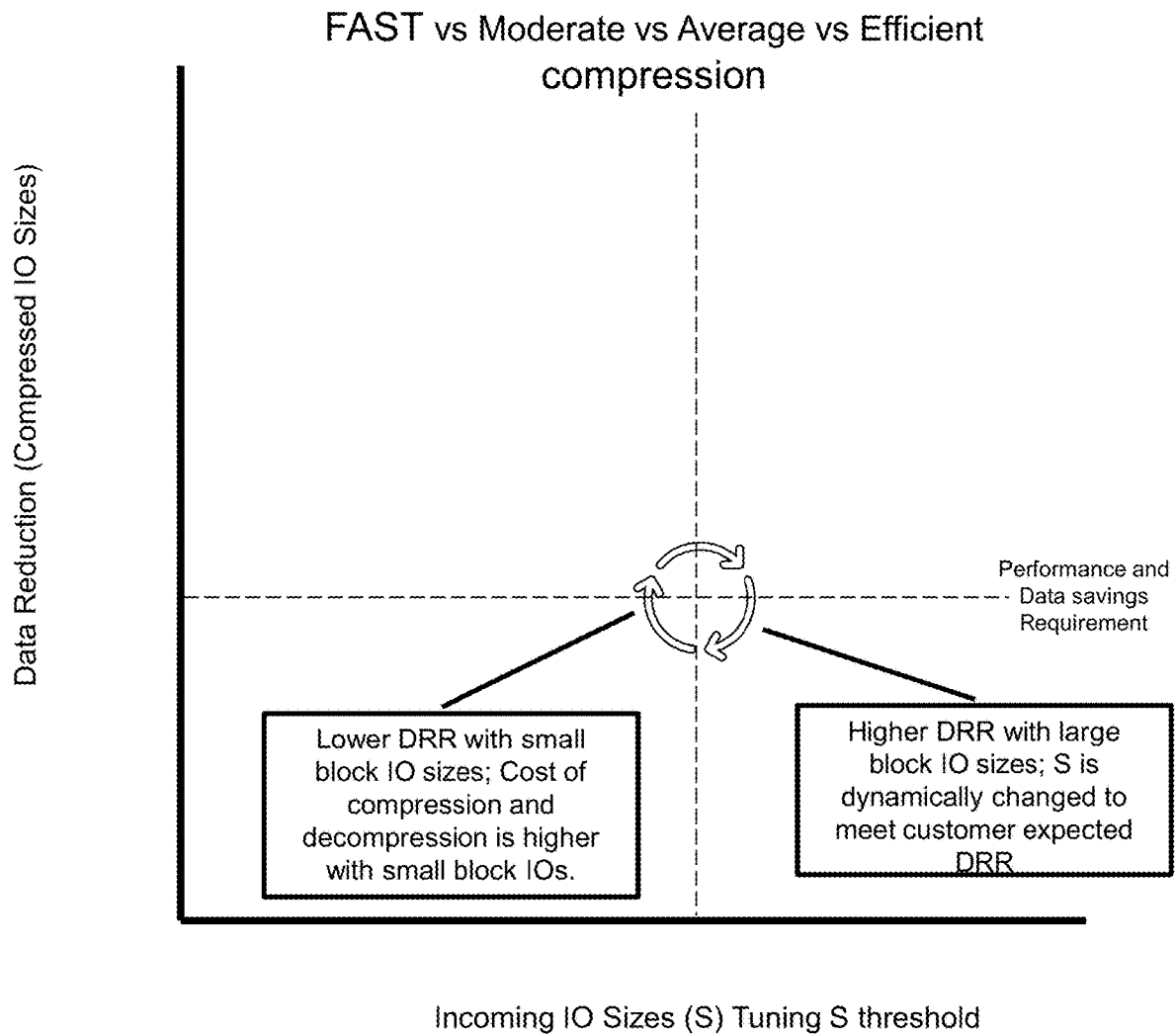
FIG. 12 illustrates dynamic IO size thresholding.

FIG. 12 illustrates IO size thresholding. A multi-dimensional IO size threshold S is used to dynamically select a compression level as a function of data reduction (compressed IO size) and incoming IO size. In the illustrated example the threshold is set at a compressed IO size of 32 k and an incoming IO size of 80 k. The most compression efficient level is used for incoming IOs that exceed 80 k in size and reduce to under 32 k. The compression level with the greatest processing efficiency is used for incoming IOs that are less than 80 k in size and reduced to under 32 k. Compression levels between level 1 and level 9 are used when the reduced size is greater than 32 k. Applying dynamic IO size threshold enables small incoming IOs to bypass the most compression efficient level.

Two or more of any of the techniques described above can be combined in any way such that a default compression level for an extent is dynamically overridden based on current network conditions, IO size, data compressibility, and other variables.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:
1. An apparatus comprising:
a compute node that manages access to a plurality of non-volatile drives on which a primary array replica storage object is maintained, including responding to commands from host servers to update segments of data on the primary array replica storage object, the compute node comprising a microprocessor, volatile memory, and inline compression hardware configured to compress the segments into replication data at line rate for transmission to a target storage system via a network to update a secondary array replica of the storage object, the compression hardware having finite capabilities for performing compression at line rate and being configurable to adjust operation of the compression hardware toward full utilization while maintaining performance of compression at line rate by selective implementation of one of a plurality of compression levels characterized by inversely related compression efficiency and processing efficiency for each segment of the replication data, where compression efficiency correlates with achieved compression ratios and processing efficiency correlates with number of segments of data of a given size that can be compressed per unit of time, per unit of compression resources, the compression levels including a first compression level that exhibits greater compression efficiency and lower processing efficiency than other compression levels, where utilization of the capabilities to compress a segment is inversely related to processing efficiency, and a second compression level that exhibits lower compression efficiency and greater processing efficiency than other compression levels, the compute node configured to dynamically select and implement ones of the compression levels to compress ones of the segments of replication data based on forecast utilization of the compression hardware, including changing from use of the first compression level to use of the second compression level responsive to a forecast that the compression hardware will be underutilized, and including changing from use of the second compression level to use of the first compression level responsive to a forecast that the compression hardware will not be underutilized, where at least one threshold value distinguishes underutilization of the compression hardware from the compression hardware not being underutilized.

2. The apparatus of claim 1 further comprising the compute node configured to select the ones of the compression levels to compress the ones of the segments of replication data based on network latency.

3. The apparatus of claim 1 further comprising the compute node configured to select the ones of the compression levels to compress the ones of the segments of replication data based on network bandwidth utilization.

4. The apparatus of claim 1 further comprising the compute node configured to select the ones of the compression levels to compress the ones of the segments of replication data based on segment size.

5. The apparatus of claim 1 further comprising the compute node configured to select the ones of the compression levels to compress the ones of the segments of replication data based on compressibility of data in an extent of the primary array replica in which the segment is located.

6. The apparatus of claim 1 further comprising the compute node configured to select the ones of the compression levels to compress the ones of the segments of replication data based on compressibility of data in an extent of the primary array replica in which the segment is located, network latency, and network bandwidth utilization.

7. The apparatus of claim 6 further comprising the compute node configured to select the ones of the compression levels to compress the ones of the segments of replication data based on segment size.

8. A method comprising:
maintaining a primary array replica storage object, including responding to commands from host servers to update segments of data on the primary array replica storage object;
maintaining a secondary array replica storage object, including compressing the segments into replication data at line rate for transmission to a target storage system via a network to update the secondary array replica of the storage object; and
for compression hardware having finite capabilities for performing compression at line rate, adjusting operation of the compression hardware toward full utilization while maintaining performance of compression at line rate by selectively implementing one of a plurality of compression levels characterized by inversely related compression efficiency and processing efficiency for each segment of the replication data, where compression efficiency correlates with achieved compression ratios and processing efficiency correlates with number of segments of data of a given size that can be compressed per unit of time, per unit of compression resources, the compression levels including a first compression level that exhibits greater compression efficiency and lower processing efficiency than other compression levels, where utilization of the capabilities to compress a segment is inversely related to processing efficiency, and a second compression level that exhibits lower compression efficiency and greater processing efficiency than other compression levels, and including selecting ones of the compression levels to compress ones of the segments of replication data based on forecast utilization of the compression hardware, including changing from use of the first compression level to use of the second compression level responsive to a forecast that the compression hardware will be underutilized, and including changing from use of the second compression level to use of the first compression level responsive to a forecast that the compression hardware will not be underutilized, where at least one threshold value distinguishes underutilization of the compression hardware from the compression hardware not being underutilized.

9. The method of claim 8 further comprising selecting the ones of the compression levels to compress the ones of the segments of replication data based on network latency.

10. The method of claim 8 further comprising selecting the ones of the compression levels to compress the ones of the segments of replication data based on network bandwidth utilization.

11. The method of claim 8 further comprising selecting the ones of the compression levels to compress the ones of the segments of replication data based on segment size.

12. The method of claim 8 further comprising selecting the ones of the compression levels to compress the ones of the segments of replication data based on compressibility of data in an extent of the primary array replica in which the segment is located.

13. The method of claim 8 further comprising selecting the ones of the compression levels to compress the ones of the segments of replication data based on compressibility of data in an extent of the primary array replica in which the segment is located, network latency, and network bandwidth utilization.

14. The method of claim 13 further comprising selecting the ones of the compression levels to compress the ones of the segments of replication data based on segment size.

15. A non-transitory computer-readable storage medium storing instructions that are executed by a computer in a storage system to perform a method comprising:
maintaining a primary array replica storage object, including responding to commands from host servers to update segments of data on the primary array replica storage object;
maintaining a secondary array replica storage object, including compressing the segments into replication data at line rate for transmission to a target storage system via a network to update the secondary array replica of the storage object; and
for compression hardware having finite capabilities for performing compression at line rate, adjusting operation of the compression hardware toward full utilization while maintaining performance of compression at line rate by selectively implementing one of a plurality of compression levels characterized by inversely related compression efficiency and processing efficiency for each segment of the replication data, where compression efficiency correlates with achieved compression ratios and processing efficiency correlates with number of segments of data of a given size that can be compressed per unit of time, per unit of compression resources, the compression levels including a first compression level that exhibits greater compression efficiency and lower processing efficiency than other compression levels, where utilization of the capabilities to compress a segment is inversely related to processing efficiency, and a second compression level that exhibits lower compression efficiency and greater processing efficiency than other compression levels, and including selecting ones of the compression levels to compress ones of the segments of replication data based on forecast utilization of the compression hardware, including changing from use of the first compression level to use of the second compression level responsive to a forecast that the compression hardware will be underutilized, and including changing from use of the second compression level to use of the first compression level responsive to a forecast that the compression hardware will not be underutilized, where at least one threshold value distinguishes underutilization of the compression hardware from the compression hardware not being underutilized.

16. The non-transitory computer-readable storage medium of claim 15 in which the method further comprises selecting the ones of the compression levels to compress the ones of the segments of replication data based on network latency.

17. The non-transitory computer-readable storage medium of claim 15 in which the method further comprises selecting the ones of the compression levels to compress the ones of the segments of replication data based on network bandwidth utilization.

18. The non-transitory computer-readable storage medium of claim 15 in which the method further comprises selecting the ones of the compression levels to compress the ones of the segments of replication data based on segment size.

19. The non-transitory computer-readable storage medium of claim 15 in which the method further comprises selecting the ones of the compression levels to compress the ones of the segments of replication data based on compressibility of data in an extent of the primary array replica in which the segment is located.

20. The non-transitory computer-readable storage medium of claim 15 in which the method further comprises selecting the ones of the compression levels to compress the ones of the segments of replication data based on compressibility of data in an extent of the primary array replica in which the segment is located, network latency, and network bandwidth utilization.

* * * * *